United States Patent [19]

Wilhelm

[11] Patent Number: 5,500,561
[45] Date of Patent: Mar. 19, 1996

[54] CUSTOMER SIDE POWER MANAGEMENT SYSTEM AND METHOD

[76] Inventor: William G. Wilhelm, 295 Vista Pl., Cutchogue, N.Y. 11973

[21] Appl. No.: 328,574

[22] Filed: Oct. 24, 1994

Related U.S. Application Data

[63] Continuation of Ser. No. 129,575, Sep. 29, 1993, abandoned, which is a continuation of Ser. No. 944,796, Sep. 14, 1992, abandoned, which is a continuation of Ser. No. 638,637, Jan. 8, 1991, abandoned.

[51] Int. Cl.$^6$ .................................... H02J 9/06
[52] U.S. Cl. ................... 307/64; 307/66; 307/48; 363/21
[58] Field of Search ................... 307/64–66, 23, 307/25, 29, 43–48, 64–68, 85–87, 120; 322/10–13, 20, 38, 39, 47, 29, 32; 318/138–139; 361/20

[56] References Cited

U.S. PATENT DOCUMENTS

| | | | |
|---|---|---|---|
| 2,194,822 | 3/1940 | Dannheiser | 171/97 |
| 4,206,608 | 6/1980 | Bell | 60/698 |
| 4,315,163 | 2/1982 | Bienville | 307/66 |
| 4,349,863 | 9/1982 | Petersen . | |
| 4,464,724 | 8/1984 | Gurr et al. | 364/492 |
| 4,508,996 | 4/1985 | Clegg et al. | 331/113 |
| 4,551,980 | 11/1985 | Bronicki | 60/698 |
| 4,630,005 | 12/1986 | Clegg et al. | 331/113 |
| 4,663,723 | 5/1987 | Umeda | 364/492 |
| 4,682,078 | 7/1987 | Pascalide | 315/86 |
| 4,731,547 | 3/1988 | Alenduff et al. | 307/85 |
| 4,742,291 | 5/1988 | Bobier et al. | 320/39 |
| 4,821,166 | 4/1989 | Albach | 363/89 |
| 4,894,764 | 1/1990 | Meyer et al. | 363/65 |
| 5,053,635 | 10/1991 | West | 307/67 |
| 5,289,045 | 2/1994 | Lavin et al. | 307/64 |

Primary Examiner—Peter S. Wong
Assistant Examiner—Aditya Krishnan

[57] ABSTRACT

A customer side power management system includes a power transducer coupled to the electric lines from the utility. The power transducer senses stochastic peak power demands from the electric utility, and provides an output signal proportional thereto. The output signal is time averaged and provided to a comparator circuit. A predetermined threshold signal is also provided to the comparator circuit, and the two signals are compared. An AC-to-DC converter or power supply is coupled to the utility's electric line and provides a DC voltage on its output. The amplitude of the DC voltage is controlled by the output signal from the comparator circuit. A power isolation and distribution circuit and a storage battery are also included. The power isolation and distribution circuit is connected between the AC-to-DC converter and the storage battery. The power management system senses peak power demands for electricity, and switches a particular load of the customer from being powered by the AC-to-DC converter to the storage battery. When there is no peak power demand, the AC-to-DC converter powers the particular load.

20 Claims, 5 Drawing Sheets

FIG. 1A

Constant Lighting Load

FIG. 1B

Semi-Random Punctuated Loads

FIG. 1C

Semi-Random Longer Cycle Loads

FIG. 1D

Composite Idealized Daily Load Profile Without Power Management System

CUSTOMER SIDE POWER MANAGEMENT SYSTEM AND METHOD

This application is a continuation of application Ser. No. 08/129,575, filed Sep. 29, 1993, now abandoned, which is a continuation of application Ser. No. 07/944,796, filed Sep. 14, 1992, now abandoned, which is a continuation of application Ser. No. 07/638,637, filed Jan. 8, 1991, now abandoned.

BACKGROUND OF THE INVENTION

1. Field of the Invention

The present invention generally relates to a system and method for managing on the customer side the consumption of power supplied by an electric utility, and more specifically relates to a system and method for reducing the customer's peak power demand charges from an electric utility. Even more specifically, the invention relates to apparatus and a method for sensing stochastic or other peak electrical power demands at a power utility customer and for controlling the operation of a secondary source of electric power situated at the customer side. In addition, the invention relates to apparatus and a method for shifting loads by buying and storing electrical power at the customer side during off-peak power demand periods and using the stored electrical power during high demand times.

2. Description of the Prior Art

Users of large amounts of electric power typically consume such power at uneven rates. This is especially true for customers with highly punctuated loads, that is, having many pieces of equipment with frequent stops and starts. Such customers can be expected to build random and cumulative peaks in their power demands. An example may be the typical supermarket with perhaps four or more different refrigeration systems each with its own independent controls generating elements of the combined peak load.

Figure 1A:
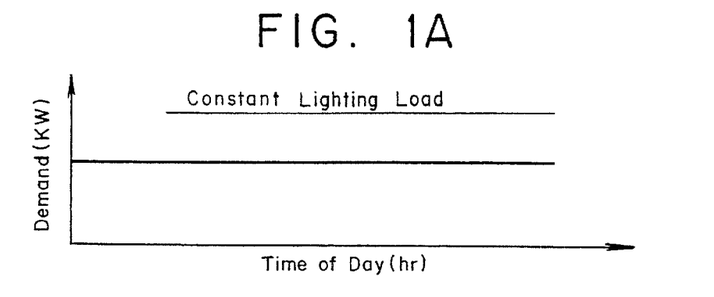
FIG. 1A is a graph of demand for electric power versus time for a constant lighting load of a hypothetical customer facility.
Figure 1B:
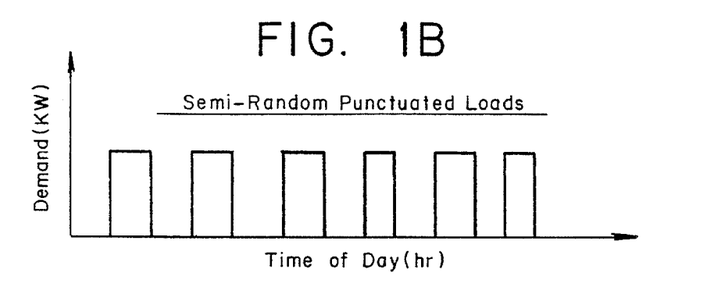
FIG. 1B is a graph of demand for electric power versus time for semi-random punctuated loads of a hypothetical customer facility.
Figure 1C:
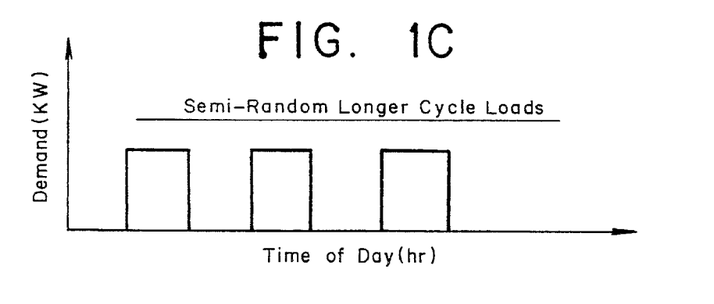
FIG. 1C is a graph of demand for electric power versus time for semi-random longer cycle loads of a hypothetical customer facility.
Figure 1D:
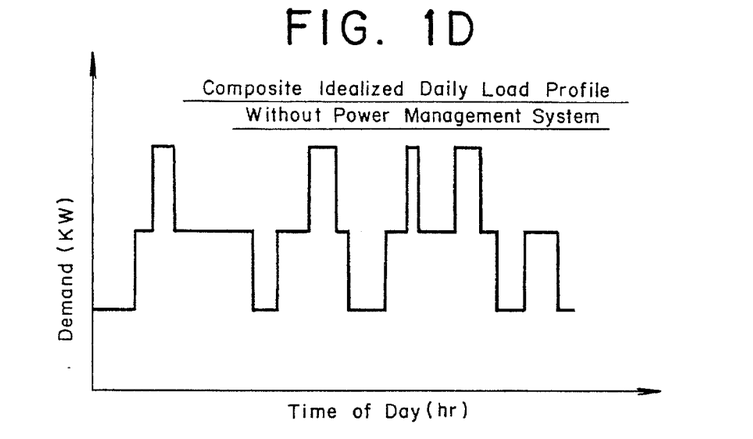
FIG. 1D is a graph of demand for electric power versus time for a hypothetical customer facility and illustrating the composite idealized daily load profile for such a facility.

A typical daily load profile for many industrial manufacturing facilities, retail establishments and the like is made up of several randomly acting loads, such as shown in FIGS. 1A–1D. FIG. 1A illustrates a constant twenty-four hour lighting load. FIG. 1B illustrates a semi-random punctuated load. FIG. 1C illustrates semi-random longer cycle loads, and FIG. 1D illustrates a composite idealized daily load profile, showing high stochastic peaks arising randomly throughout the day.

Despite these fluctuating demands for electric power, electric utilities are required to maintain a generating capacity that exceeds the maximum demand for electricity anticipated during any given period of time. Therefore, electric utilities must maintain generating capacities far in excess of average electrical power requirements in order to meet such occasional and relatively short-term demands. The formation and maintenance of such excess capacity is quite expensive, and dramatically increases the average cost of providing electric power.

In order to better allocate the cost of providing excess power generation capacity to those customers most requiring such capacity, and in order to encourage such customers to distribute their demand for electric power, the utility rate schedule applied to such customers is typically divided into at least two components. The first component is an energy usage charge which reflects the utility's own energy generation and transmission costs. The charge is typically calculated in cents per kilowatt hour of energy consumed during a particular billing period. The second component is a peak demand charge which reflects the utility's capital costs, and is based on the deviation from average energy consumed by the customer during a predetermined demand interval period of time. The peak demand charge is calculated as cents or dollars per kilowatt of actual peak demand. Such peak demand charges can be quite high as a percentage of the total utility charge over a particular billing period.

Owing to the increased use of greater peak demand charges by electric utilities, large industrial consumers of electricity have begun investigating methods for reducing peak power demands from the electric utility. One approach is peak demand shedding. Peak demand shedding is the practice of sequencing equipment use so that only an acceptable number of load contributors are allowed to operate simultaneously. This method is expensive to control and restrictive to the customers.

Another approach is to increase the efficiency of the electrical loads used by the customer. Although this approach is in a positive direction, it yields relatively small gains in reducing peak demands, and it is peak demand that has the greatest effect on the rate that the consumer pays for his power.

A third approach is use peaking generators. Peaking generators are generators provided by the power company to be used during peak demand portions of the day. These may be located in closer proximity to the utility's customer sites. Problems associated with peaking plants (generators) involve high capital investment, low duty cycle, serious environmental considerations and relatively long time before completion.

OBJECTS AND SUMMARY OF THE INVENTION

It is an object of the present invention to provide a system and method for managing electric power on the customer side.

It is another object of the present invention to provide apparatus for reducing the peak power demand of a customer from an electric power utility by controllably directing power from a storage battery to a particular relatively constant and substantial load of the customer, such as fluorescent lighting, thereby diverting peak power demand normally derived from the electric utility. This reduction of peak power demand of a customer from an electric power facility by controllably directing power from a storage battery to a particular load, such as fluorescent lighting, thereby diverting peak power demand normally derived from the electric utility, is of enormous importance and represents a major departure from the prior art in handling the rapidly emergent needs of substantial customer loads which could be served by direct current power as separate and distinct from AC electrical power or from AC electrical power converted to DC.

It is a further object of the present invention to provide apparatus used in a power management system for converting AC power to a DC regulated power based on a high efficiency switching mode power supply topology which can use a storage battery as part of its intrinsic circuitry.

It is still another object of the present invention to provide apparatus for proportionally directing power from a battery storage device used in a power management system in response to the magnitude of the demand for peak power detected by the power management system.

It is yet a further object of the present invention to provide a customer side, power management system and method which may automatically and substantially increase the efficiency of power usage by the customer in major load areas, such as lighting and other electronic loads, relative to other approaches.

In accordance with one form of the present invention, a customer side, power management system includes a power transducer having one or more sensors connected to the utility's power lines coming into the customer's facility. The power transducer measures the power being drawn by the customer's facility, and provides a signal proportional to the power drawn.

The system may further include an integrator connected to the output of the power transducer. The integrator averages the signal from the transducer for a predetermined integration period, in much the same way as a utility measures peak power consumption. The output signal from the integrator is provided to one input of a comparator circuit (or a differential amplifier circuit which, in effect, acts as a comparator), which is also included in the system.

The other input of the comparator circuit is connected to either an automatically adjustable set point circuit or a manually adjustable set point circuit, either of which can be coupled to the comparator circuit by an appropriate switching circuit. The set point circuits provide a threshold signal to the comparator circuit.

The comparator circuit compares the signal from the integrator with the set point circuit's threshold signal, and provides an output signal of at least one magnitude if the integrator's output signal is greater than or equal to the threshold signal, and of at least another magnitude if the integrator's output signal is less than the threshold signal.

The power management system of the present invention further includes an AC-to-DC converter, which is preferably a switching mode type power supply. The power supply has a control input to which is provided the output signal from the comparator (or differential amplifier) circuit. The switching power supply receives at least a portion of the AC power provided by the utility to the customer's facility, and converts this portion to DC power on its outputs.

The DC power from the switching mode type DC power supply is provided to an isolation and distribution circuit and to a storage device, such as a battery. The isolation and distribution circuit will control and direct power to a load from either the DC power supply or the storage battery or proportionally from both, in accordance with the quantity of power consumed by the facility and sensed by the power transducer of the system.

These and other objects, features and advantages of this invention will become apparent from the following detailed description of illustrative embodiments thereof, which is to be read in conjunction with the accompanying drawings.

DETAILED DESCRIPTION OF THE PREFERRED EMBODIMENTS

Figure 2:
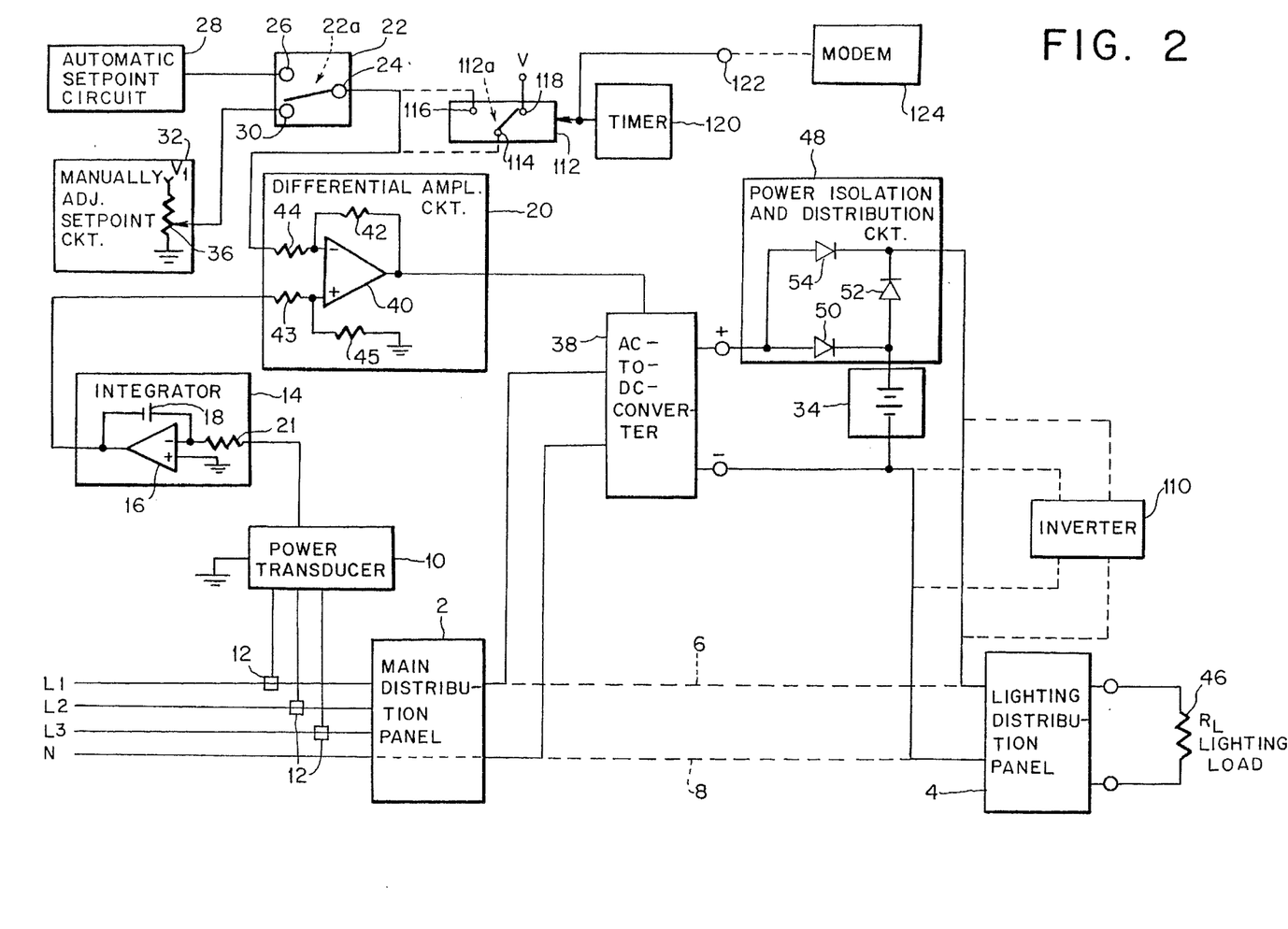
FIG. 2 is a block diagram of a customer side, power management system formed in accordance with the present invention and illustrating its interface with existing electric utility power lines of the customer facility.

Referring now to FIG. 2 of the drawings, it will be seen that a customer side, power management system formed in accordance with the present invention may be easily interconnected with the existing electric power wiring of the customer facility to monitor the load requirements of the customer. To facilitate an understanding of the invention, FIG. 2 shows three phase power wiring (i.e., wires labeled L1, L2 and L3 representing each phase) and a neutral (i.e., N) wire coming from the utility and being received by the customer facility. The three phase wires, L1, L2 and L3 and the neutral wire N are received by a main distribution panel 2 of the customer facility. The main distribution panel 2 distributes the power throughout the facility, and in many cases provides power to a lighting distribution panel 4 which, as its name implies, distributes power to the various lighting circuits of the facility. That is, the main distribution panel 2 conventionally distributes the three phase power wiring of the electrical utility throughout the consumer facility and in so doing distributes power to the various loads served by the customer facility. As is illustrated in FIGS. 1A–1C, there are three types of very common AC electrical loads which may be required to be satisfied by the AC electrical power generated at the public or electrical facility and emanating from the illustrated consumer facility and they are a Lighting Load (see FIG. 1A), Semi-Random Punctuated Loads (see FIG. 1B), and Semi-Random Longer Cycle Loads (see FIG. 1C). Thus, the three phase power wiring L1, L2, and L3 and the neutral wiring N connects from the public utility side of the main distribution panel 2 and issues therefrom as AC electrical conductors on the customer side of this panel into connection with the composite of loads which are required to be satisfied by the power emanating from the electrical utility, as shown in FIGS. 1A–1C. Normally, the main distribution panel 2 and the lighting distribution panel 4 are interconnected by one or more power lines 6, including a neutral line 8, but for purposes of this invention, the interconnecting lines between the main distribution panel and the lighting distribution panel are interrupted, as illustrated by the broken lines in FIG. 2. It will be understood that the interruptions of the lines between the main distribution panel 2 and the lighting distribution panel 4 with introduction of the inverter 1 are necessary only if the Lighting Load is not capable of being powered solely by direct current, as distinct from a situation where the Lighting Load may be powered, in whole or in part, by AC power. To the extent it is not so capable, the inverter 1 must be employed to supply AC power, all in the event that there could be failure of the electrical facility to deliver any AC at all.

In accordance with the present invention, the power management system includes a power transducer 10. The power transducer 10 has associated with it one or more voltage or current sensors 12, each sensor being coupled to a respective power line phase. The power transducer 10 measures in real time the power consumed by the customer facility from the electric utility, and provides an output signal corresponding to this measurement. The output signal provided by the power transducer 10 is proportional in magnitude to the power consumed by the customer facility. For example, the output signal may be in terms of voltage, and have a range of from 0 to +10 or −10 volts, which would correspond to a power consumption of from 0 to 100 kilowatts. A suitable power transducer 10 which may be used for the power management system of the present invention is Part No. PCE-20 manufactured by Rochester Instrument Systems, Inc.

The output signal from the power transducer 10 is preferably provided to an integrator circuit 14. The integrator circuit 14 averages the real time power measurement made by the power transducer. The integrator circuit 14 simulates the operation of a similar integration circuit which the utility uses to average the peak power demands of its customers.

The integrator circuit 14 may be formed in various ways, including using an operational amplifier 16 with a feedback capacitor 18 and an input resistor 20, as shown in FIG. 2. The values of capacitor 18 and resistor 20 are selected to provide a desired integration time. The integrator circuit 20 shown in FIG. 2 provides a negative gain; accordingly, if such a circuit is used, it may be coupled to the 0 to −10 V output of the power transducer to provide a positive output voltage signal which varies in response to changes in power drawn from the utility and sensed by the sensors 12.

The power management system of the present invention further includes a comparator circuit which, in a preferred form, is a differential amplifier circuit 21. The output of the integrator circuit 14 is provided to a first input of the differential amplifier circuit 21. A second input of the differential amplifier circuit 21 is connected to a switching circuit 22, which is functionally depicted in FIG. 2 as a single pole, double throw switch 22a.

More specifically, the "wiper" arm 24 of the switching circuit is connected to the second input of the differential amplifier circuit 21, one pole 26 of the switching circuit is connected to an automatically adjustable set point circuit 28, and the other pole 30 of the switching circuit is connected to a manually adjustable set point circuit 32.

The automatically and manually adjustable set point circuits 28, 32 provide a threshold signal, which may be in the form of a voltage, through the switching circuit 22 to the second input of the differential amplifier circuit 20. The threshold signal represents the power level at which a secondary source of DC power, such as a storage battery 34, forming part of the power management system is to take over in supplying power to one or more various loads in the customer's facility, as will be described.

Figure 3:
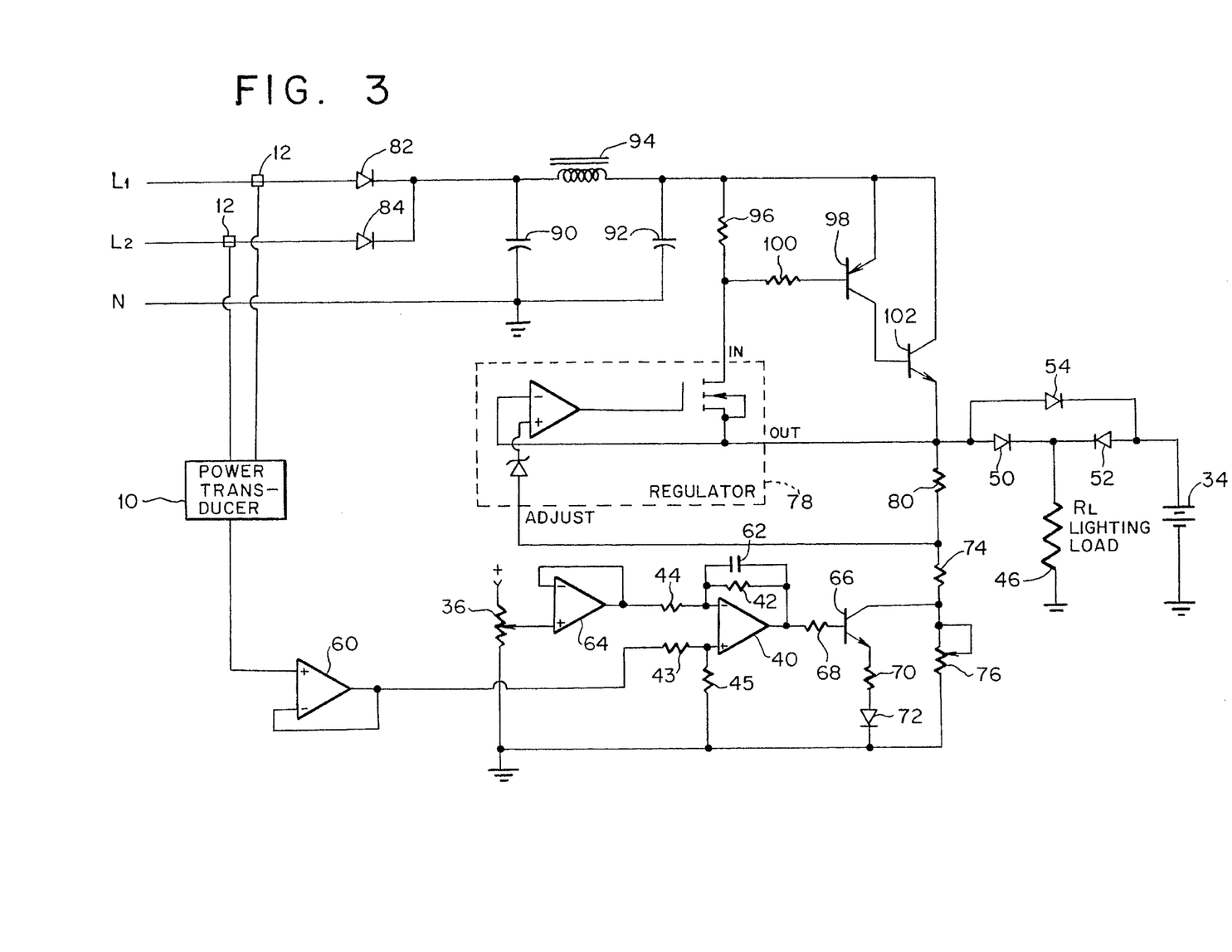
FIG. 3 is a schematic diagram of an alternative power management system formed in accordance with the present invention.

Various manually adjustable set point circuits are envisioned to be used in the present invention. One example of such is a potentiometer 36 connected between positive and negative voltages or a voltage V1 and ground, with its wiper arm connected to the pole 30 of the switching circuit 22. Such a circuit would provide a threshold voltage to the differential amplifier circuit 21. The set point circuit 32 would be adjusted after an analysis of the customer's energy consumption profile. The threshold would be set so that any stochastic or recurrent (i.e., non-random, time of day) peaks in the customer's daily power demand would be supplied in full or proportionally by the secondary DC power source of the power management system, as illustrated by FIG. 3.

The automatically adjustable set point circuit 28 will periodically derive and store the maximum value of the actual peak power demands over predetermined time intervals, for example, daily or monthly, and provide a threshold which is based on a "moving average" computed by the circuit. This threshold signal is provided to the input of the differential amplifier circuit 21 through the switching circuit 22. The automatic set point circuit 28 will automatically adjust the threshold signal in accordance with the moving average of the customer's peak power requirements which it calculates algorithmically. An example of such a circuit is disclosed in U.S. Pat. No. 4,731,547, which issued to Phillip Alenduff et al., the disclosure of which is incorporated herein by reference.

As its name implies, the comparator (or more preferably the differential amplifier) circuit 20 will compare the threshold signal provided by either set point circuit 28,32 which is selected by the switching circuit 22 with the output signal from the integrator circuit 14, which output signal represents the power being drawn from the utility averaged over the predetermined integration period. If the output signal from the integrator circuit 14 is greater in magnitude than the threshold signal, i.e., indicating that excessive or peak power is being consumed, the differential amplifier circuit 20 will sense this and provide a proportional output signal which is compatible with that required to control an AC-to-DC converter or switching mode type power supply 38 forming part of the power management system, as will be described.

One form of a differential amplifier circuit 20 which is suitable for use in the present invention is an operational amplifier 40 having a feedback resistor 42 and an input resistor 44, with the threshold signal being provided to the inverting input of the operational amplifier 40 through the input resistor 44, and the output signal from the integrator circuit 14 being provided to one side of a second input resistor 43 whose other side is connected to the non-inverting input of the operational amplifier and to another resistor 45 to ground. When the values of the first input and feedback resistors 44, 42 equal those of the second input and the grounded resistors 43, 45, respectively, the output signal from the differential amplifier circuit 20 will be a voltage level equal to the difference between the voltage levels of the integrator circuit's output signal and the threshold signal, multiplied by the ratio between the values of the feedback and first input resistors 42, 44. Accordingly, the output signal from the differential amplifier circuit 20 is preferably a voltage level which varies proportionally with the difference between the output signal from the integrator circuit 14 and the set point threshold signal level.

As will be described in greater detail, many AC-to-DC power supplies adjust their output voltage levels in proportionment to the voltage applied to their control signal input, and operate on positive control signal voltages, for example, 0 volts to 10 volts for an output adjustment of from 125 volts to 110 volts. To prevent negative voltage swings in the output signal from the differential amplifier circuit 20, such as when the level of the output signal of the integrator circuit is below the set point threshold signal level, one can provide a positive supply voltage to the appropriate supply terminal of the operational amplifier 40, and ground the negative supply terminal. Alternatively, one may connect a diode (not shown) having its anode connected to ground and its cathode connected to the output of the operational amplifier 40 to clamp the differential amplifier's output signal to 0 volts when the output signal from the integrator circuit 14 is less than the set point threshold signal level.

Instead of using the differential amplifier circuit 20, which provides a continuously variable output signal which is proportional to the difference between the threshold signal and the integrator circuit's output signal, a simple comparator, such as in the form of an operational amplifier, may be used. The integrator's output signal and the threshold signal are provided to the two inputs of the comparator, and the comparator's output signal is provided to the control input of the AC-to-DC converter 38. When the integrator circuit's output signal is greater than the threshold signal, the output signal of the comparator will be in a first state to signal the AC-to-DC converter 38 to provide a first output voltage level. When the integrator circuit's output signal is less than or equal to the threshold signal, the output signal of the comparator will be in a second state to signal the AC-to-DC converter 38 to provide a second output voltage level.

As mentioned previously, the power management system of the present invention includes an AC-to-DC converter circuit 38. Preferably, the converter circuit 38 is a power supply of the switching type, which is known to have good regulation and high efficiency. The power line 6 and neutral line 8 from the main distribution panel 2, which originally were provided to the lighting distribution panel 4, are now provided to the AC inputs of the switching power supply 38. The output signal from the comparator or differential amplifier circuit 20 is provided to the control input of the power supply. The switching power supply 38 will convert the AC power provided to it into a DC voltage and current to run a particular load or loads at the customer facility, such as a fluorescent lighting load 46, as illustrated by FIG. 2. A suitable AC-to-DC switching power supply 38 which may be used in the power management system of the present invention is Part No. 2678644 manufactured by Techni Power Corp., a Penril Company, located in Connecticut. For greater power handling requirements, several power supplies may be connected in parallel, all being controlled by the comparator or differential amplifier circuit 20. With whichever AC-to-DC converter 38 that is used, the comparator or differential amplifier circuit 20 is designed to provide the compatible control signal to vary the converter output as required.

The output voltage of the switching DC power supply 38 is adjustable proportionally to the control signal it receives. For example, the power supply 38 may be selected or designed such that a control voltage provided to the control input of the power supply of from 0 to 10 volts will inversely adjust the output DC voltage of the power supply from 125 to 110 volts. As will be described in greater detail, the control of the output voltage of the AC-to-DC power supply 38 is an important aspect of the power management system, as it will allow the lighting or other load to be driven by power from the electric utility or from the secondary DC source, such as the storage battery 34, situated at the customer facility.

The DC output voltage from the AC-to-DC power supply 38 is provided to a power isolation and distribution circuit 48 and to a second source of DC power which, in the preferred form of the invention, is a storage battery 34. More specifically, the positive terminal of the power supply 38 is provided to the input of the power isolation and distribution circuit 48, one output of the power isolation and distribution circuit is provided to the power line 6 connected to the lighting distribution panel 4, and another output of the power isolation and distribution circuit is provided to the positive terminal of the storage battery 34. The negative output of the power supply 38 is provided to the negative output of the storage battery 34 and to the neutral line 8 connected to the lighting distribution panel 4. Connected in this manner, the AC-to-DC power supply 38 will not only provide DC power to the lighting or other load 46 of the customer, but will also charge the storage battery at times of low power demand.

In a preferred form of the present invention, the power isolation and distribution circuit 48 basically consists of a series of three interconnected diodes 50,52,54. The first diode 50 has its anode connected to the positive output terminal of the power supply 38, and its cathode connected to the positive terminal of the storage battery 34. The second diode 52 has its anode connected to the positive terminal of the storage battery 34, and its cathode connected to the first output of the power isolation and distribution circuit 48, which output is connected to the power line 6 provided to the lighting distribution panel 4. The third diode 54 has its anode connected to the positive output terminal of the power supply 38, and has its cathode connected to the cathode of the second diode 52 and to the first output of the power isolation and distribution circuit 48.

The diodes of the power isolation and distribution circuit provide isolation between the storage battery 34 and the AC-to-DC power supply 38, and provide a larger "dead band" or buffer region to allow the storage battery to be switched into the circuit, to supply power to the lighting or other load 46, or isolated from the circuit. The diodes 50–54 used in the power isolation and distribution circuit are preferably high power, silicon diodes.

The power isolation and distribution circuit 48, power supply 38 and storage battery 34 work in the following manner. Assuming the storage battery is 124 volts DC, and the output of the AC-to-DC power supply is 125 volts DC, for example, then the first and third diodes 50,54 are forward biased so that the potential at the first and second outputs of the power proportioning circuit is 124.3 volts each, assuming diode drops of 0.7 volts. The second diode 52 is essentially back biased and not turned on. The DC power supply 38 is supplying current to the lighting or other load 46 as well as to the storage battery 34 to charge the battery. This condition occurs during times when there is no peak power demand.

If, for example, the output of the AC-to-DC power supply decreases to 123 volts, then the first and third diodes 50,54 of the power isolation and distribution circuit are back biased, and the second diode 52 is forward biased. Under such conditions, the storage battery 34 contributes power to the lighting or other load. This condition occurs during peak power demands. The amount of power contributed by the battery 34 to the load is substantially equal to the amount of power drawn from the utility by the customer which exceeds the set point threshold, up to the limit of the load.

For example, assume that the customer demand is 750 K watts, the set point threshold is set at 800 K watts, and the lighting load controlled by the power management system of the present invention is 100 K watts. Since the customer demand is below the peak set point threshold, the lighting load of the customer will be entirely powered by the utility through the AC-to-DC converter, and the storage battery 34 is being recharged under these conditions. This can be considered a first mode of operation of the power management system.

Assume now that the customer's demand has increased to 850 K watts, which is 50 K watts over the 800 K watt set point threshold set in the management system. Under such conditions, the lighting load controlled by the system will draw 50 K watts of power from the utility through the AC-to-DC converter 38 and 50 K watts of power from the storage battery. Thus, there is a proportional sharing of power to the load from the utility and the storage battery to provide power to the lighting or other load. This can be considered a second mode of operation of the system.

If customer demand increased to 1000 K watts, which is 200 K watts above the threshold, the lighting load will be powered entirely from the storage battery and not by the utility. This is a third "uninterruptable" mode of operation of the system.

Preferably, the storage battery 34 is formed from a series connection of ten, 12 volt DC batteries. One form of battery which is suitable for use is a sealed, maintenance free lead acid Absolyte(TM) series of batteries manufactured by GNB, Inc.

The operation of the power management system of the present invention will now be described. A stochastic or recurrent peak power demand, such as shown in FIG. 1D, is detected by the power transducer 10. The voltage level of the output signal from the power transducer will increase, and this increase in voltage level will be averaged over a predetermined integration period by the integrator circuit 14. The output signal of the integrator circuit will accordingly also increase in magnitude. If the output signal level of the integrator circuit 14 is greater than the threshold signal level of either set point circuit 28,32 connected to the system, the comparator or differential amplifier circuit 20 will sense this and provide an appropriate output signal to the AC-to-DC power supply 38 to reduce the power supply output voltage to below the potential of the storage battery 34. Since the battery potential is greater than the power supply voltage, power from the battery 34 will be supplied to the load.

If electric power demand from the utility decreases, a corresponding decrease in the magnitude of the output signals from the power transducer 10 and the integrator circuit 14 will follow. If the output signal from the integrator circuit falls to or below the threshold level set by the set point circuits 28,32, the comparator or differential amplifier circuit 20 will sense this and will provide the appropriate signal to the control input of the switching power supply 38 to increase the output voltage level of the power supply. If the supply's output voltage level is greater than the present or "spot" potential of the storage battery 34, the load will again be fully served by the power supply, and current will also flow to the battery until the battery is fully charged. In this mode, no current will flow from the battery to the load.

Another form of the power management system of the present invention is shown schematically in FIG. 3. The power transducer 10 is connected to one or more of the customer's utility power lines, as shown in FIG. 2, and has its output connected to the non-inverting input of an operational amplifier 60 configured as a non-inverting buffer amplifier. The output of the buffer amplifier 60 is connected to one side of a differential amplifier circuit including an operational amplifier 40, a first input resistor 43 connected between the buffer amplifier output and the non-inverting input of the operational amplifier 40, and another resistor 45 connected between the non-inverting input of the operational amplifier and ground. The differential amplifier includes another input resistor 44 connected to the inverting input of the operational amplifier 40, a feedback resistor 42 connected between the output and inverting input of the operational amplifier and a feedback capacitor 62 connected in parallel with the feedback resistor. The input resistors 43,44 are preferably equal in value, as are the feedback resistor 42 and grounded resistor 45, as in the previous embodiment. The feedback capacitor 62 is provided to slow the response time of the differential amplifier.

A manual set point threshold circuit includes a potentiometer 36 having its opposite legs connected between a positive voltage and ground and its wiper provided to the non-inverting input of an operational amplifier 64 configured as a non-inverting buffer amplifier. The output of the buffer amplifier 64 is provided to the other input resistor 44 of the differential amplifier.

The output of the differential amplifier is provided to a voltage-to-current converter. The voltage-to-current converter includes an NPN transistor 66, a base resistor 68 connected between the output of the differential amplifier and the base of the transistor 66, and an emitter resistor 70 and series connected diode 72 which together are connected between the emitter of the transistor and ground. The collector of the transistor 66 is connected to one end of a fixed resistor 74 and one end and the wiper of a multi-turn potentiometer 76, whose other end is connected to ground. The remaining end of the fixed resistor 74 is connected to the Adjust input of a series regulator 78, such as Part No. TL783C manufactured by Texas Instruments, and to one end of another fixed resistor 80 whose other end is connected to the output (OUT) of the regulator 78.

As in the previous embodiment, the power management system includes an AC-to-DC converter comprising the regulator 78 mentioned previously, a full wave rectifier circuit consisting of two diodes 82,84, and a conventional pi filter consisting of two by-pass capacitors 90,92 and a series choke or inductor 94, the filter circuit being connected to the output of the rectifier circuit. The output of the filter circuit is connected to one leg of a fixed resistor 96, whose other leg is connected to the input (IN) of the regulator 78 and to the base of a PNP transistor 98 through a base resistor 100. The emitter of the transistor 98 is connected to the output of the filter circuit, and the collector is connected to the base of an NPN power transistor 102. A suitable power transistor 102 which may be used is Part No. TIPL762 manufactured by Texas Instruments. Of course, the power transistor is selected in accordance with the power requirements of the system. The collector of the power transistor 102 is connected to the emitter of its driving transistor 98 and to the output of the filter, and the emitter of the transistor 102 is connected to the output of the regulator 78. Transistors 98 and 102 and their associated components form a current booster circuit.

The power management system shown in FIG. 3 further includes an isolation and distribution circuit consisting of three interconnected first, second and third diodes 50,52,54, as in the previously described embodiment illustrated by FIG. 2. The output of the regulator 78 is connected to the anodes of first and third diodes 50,54. The anode of the second diode 52 and cathode of the third diode 54 are connected to the positive terminal of a storage battery 34 used in the power management system, and the cathodes of the second and third diodes 52,54 are connected to the load 46 which is powered by the system.

The power management system shown in FIG. 3 operates in the following manner. When the power drawn from the utility is such that the output level of the transducer 10 is below the set point threshold level, the transistor 66 of the voltage-to-current converter is non-conducting. This effectively increases the resistance of the lower leg of a resistor divider network defined by resistor 80, comprising the upper leg, and the combination of resistors 74 and the parallel combination of the multi-turn potentiometer 76 and the resistance of the voltage-to-current converter, which comprise the network's lower leg. Under such conditions, the voltage at the anode of the first diode 50 will be greater than the voltage at the anode of the second diode 52, which is the voltage of the storage battery 34. The first diode 50 will be turned on and the second diode 52 will be back biased so that power from the utility through the AC-to-DC converter, i.e., the full wave rectifier circuit, the filter and the current booster circuit, will be provided to the load 46.

When the transducer 10 of the power management system senses an increase in utility power drawn by the customer, the output signal from the buffer amplifier 60 will exceed the magnitude of the output signal of the threshold signal's buffer amplifier 64. In response, the differential amplifier will provide a positive voltage output signal which will cause the transistor 66 of the voltage-to-current converter to conduct current. This effectively lowers the resistance of the lower leg of the resistor divider network which, in turn, decreases the voltage on the anode of the first diode 50. If the voltage on the anode of the first diode 50 decreases to a point where the second diode 52 is forward biased, current will flow from the storage battery 34 to the load. As now less power is drawn from the utility, the output voltage from the power transducer 10 will decrease, which affects the output voltage of the differential amplifier and the current drawn through the collector of the voltage-to-current converter transistor 66. This will change the voltage on the anode of the first diode 50 to a point where there is a proportional sharing of power from the storage battery and from the utility. Thus, the power management system acts as a servo system with feedback and has a self-leveling capability.

As can be seen from the above description, the power management system of the present invention can be easily implemented in a customer facility with little or no rewiring. Because the main distribution panel 2 is usually connected to a second, lighting distribution panel 4, the interconnection between the two can be broken and connected to the power management system. Also, fluorescent lighting, which may represent approximately 40% of the total load for some utility customers, is a particularly attractive load to work in conjunction with the power management system. The lighting load remains fairly constant throughout the day and, therefore, the power management system parameters may be easily optimized for operating such a load. In addition, many of the electronic ballasts currently, and increasingly, used in fluorescent lighting will function on either direct current (DC) or alternating current (AC). If fluorescent lighting, either electronically ballasted or magnetically ballasted, is to be controlled by the system and powered by AC, this may be accomplished by using an inverter 110 interconnected between the output of the power isolation and distribution circuit 48 (and the negative terminal of the AC-to-DC converter 0.38) and the lighting distribution panel 4, as shown by dashed lines in FIG. 2. Accordingly, fluorescent and other lighting is perfectly suited for operation with the power management system of the present invention.

Figure 4:
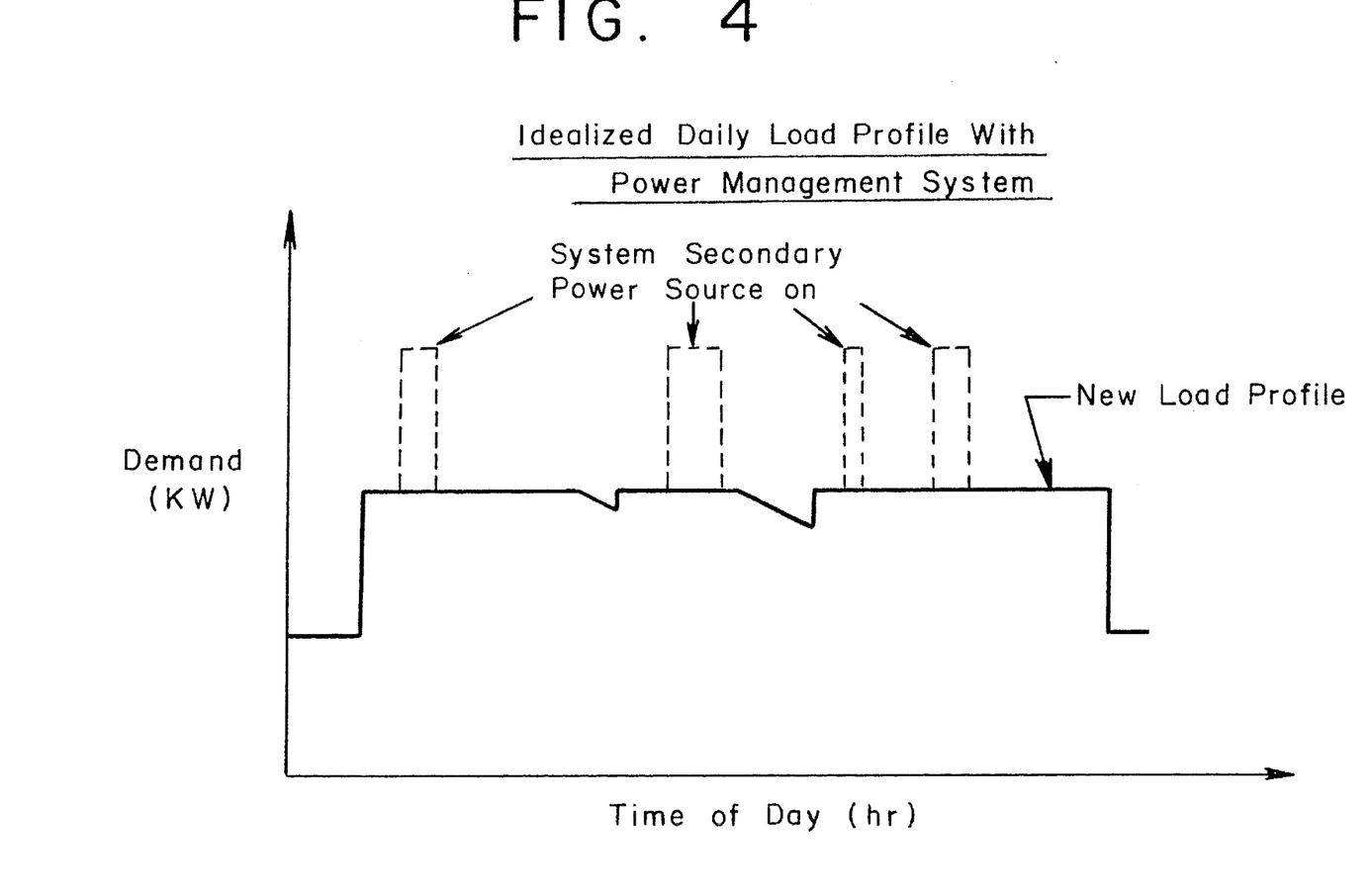
FIG. 4 is a graph of demand for electric power versus time, which is similar in many respects to FIG. 1D, illustrating the results of load clipping by employing the system and method of the present invention.

The power management system of the present invention is designed to remove stochastic or recurrent peak loads from the customer's electric utility power line, to the principal financial advantage of the customer in avoiding demand charges, as illustrated by FIG. 4 of the drawings, which shows by dashed lines the elimination of such peaks from the customer's utility demand. Also, the power management system provides for load shifting, to the principal advantage of the power utility. The threshold is adjustably set by the system to remove and shift such demand loads, as illustrated by FIG. 5 of the drawings.

Figure 5:
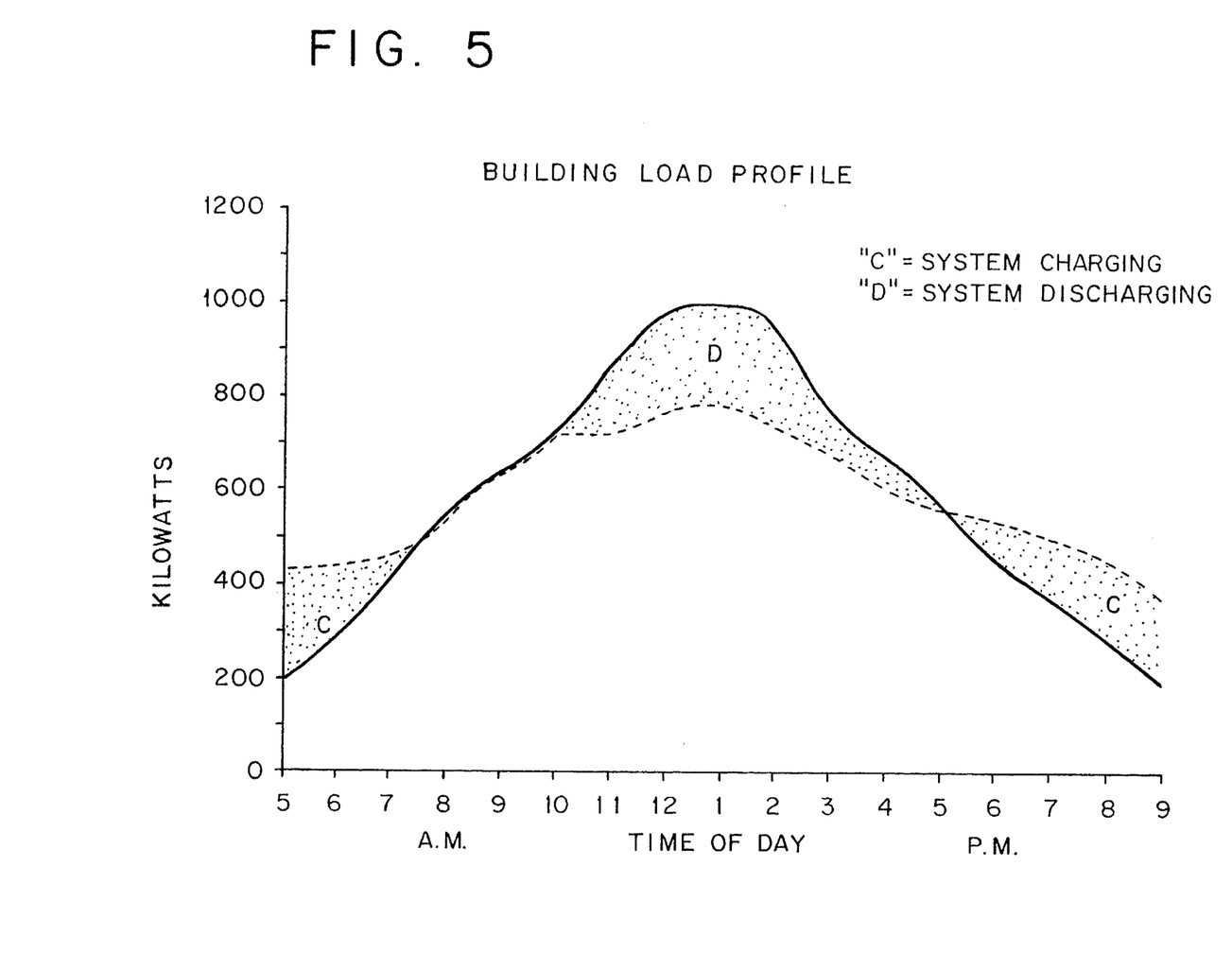
FIG. 5 is a graph of demand for electric power against time similar in many respects to FIG. 4, illustrating the daily load profile of a hypothetical customer facility with the power management system of the present invention operating in the facility.

A typical customer load profile is shown by the solid line in FIG. 5, with a peak in the profile occurring at or about 1:00 p.m. During the peak period, the power management system automatically turns on to reduce the utility power consumed. During such times, the storage battery 34 is mainly discharging, as represented by the letter D in FIG. 5, to provide power to the lighting or other loads. This reduces the customer load profile to that illustrated by the dashed line in FIG. 5.

At times of low power demand, the power management system will charge the storage battery 34, as described previously. The periods that the battery is charging are indicated by the letter C in FIG. 5. This load shifting may also be performed at preset times. As illustrated by FIG. 2, the connection between switching circuit 22 and the differential amplifier circuit 20 may be broken, as illustrated by dashed lines, to add a relay or switching circuit 112 between the two. Relay or switching circuit 112 is functionally depicted as a single pole, double throw switch 112a, with its wiper 114 connected to the differential amplifier circuit 20 and one pole 116 connected to wiper 24 of switching circuit 22. The remaining pole 118 may be connected to a voltage source V having a magnitude which is less than that of the output signal from the integrator circuit 14 or power transducer 10 expected during the periods when load shifting is desired.

A timing circuit 120 is coupled to the relay or switching circuit 112 to control the circuit such that, at predetermined times, the connection between switching circuit 22 and differential amplifier circuit 20 will be broken by relay or switching circuit 112, and voltage V will be applied to differential amplifier circuit 20 through relay or switching circuit 112. Because voltage V is selected to be less than the output voltages of integrator circuit 14 and power transducer 10, the output signal of the differential amplifier circuit 20 will ensure that the output voltage of the AC-to-DC converter circuit 38 is lower than the potential of storage battery 34. Accordingly, battery 34 will provide predetermined power to the selected loads during programmed "on" times controlled by timer 120.

An external control input 122 may also be provided and connected to the relay 112 to allow an external control signal to switch the relay when load shifting is desired. The control input may optionally be connected to a modem 124 situated at the customer side so that, for example, the utility itself may remotely control when load shifting at the customer side is to occur by transmitting a signal to the modem 124 to control relay 112.

Since the utility charges a premium for peak power consumption, removal of stochastic or recurrent peak loads from the utility may significantly reduce the electricity charges incurred by the customer.

Since the storage battery 34 is only being used during infrequent times of peak power demands, the controlled depth of discharge and the charge and discharge cycle of the storage battery can be minimized. As a result, the life of the battery will be prolonged.

It should also be noted that other types of secondary power sources may be used, such as a power generator or photovoltaic device. These devices may be used instead of the storage battery 34, or may be appropriately switched into the power management system to substitute for or supplement the storage battery.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An electrical power management system comprising the combination of:

AC electrical connection means including AC input conductors receiving AC electrical energy from a public utility, and AC electrical load means connected to the input conductors for routing AC electrical power within the power management system to a plurality of electrical loads associated therewith, and at least one DC load means associated with the power management system, said power management system comprising at least two DC power supply entities including an AC-to-DC first power supply means dedicated to said one DC load means and connected to said AC input conductors for converting AC electrical power to constitute a first DC power supply means and at least one direct current power supply means also dedicated to said one DC load means and consisting of a direct current source, said direct current source and said first DC power supply means being isolated from each other and each being capable of supplying said one DC load means with all of the power required to power it, and circuit means interconnecting said first DC power supply means, said direct current power supply means and said one DC load means for operation in one of three modes, 1) a mode in which said first DC power supply means supplies all of the power for said one DC load means, 2) a mode in which said first DC power supply means and said direct current power supply means share power to said one DC load means, and 3) a mode in which the direct current power supply means supplies all the power for said one DC load means.

2. An electrical power management system as defined in claim 1 wherein said circuit means is in the form of an array of steering diodes and includes means for varying the output level of said first DC power supply means relative to the output level of said direct current supply means.

3. In combination with a public utility which supplies AC electrical energy to a plurality of consuming customer entities and which public utility includes a plurality of electrical conductors for delivering said AC electrical energy to the consuming customer entities;

each consuming customer entity having an electrical distribution box connected to said electrical conductors with load conductors issuing therefrom for connection to the consuming customer's electrical loads, some of the electrical load conductors being connected to one of the consuming customer's electrical loads which is a special load such as a lighting load, some of the electrical load conductors of the customer entity being connected to an AC-to-DC power primary source of DC power and there being an electrically separate source of direct current power in the form of direct current source means, sensing means coupled with the electrical conductors of the public utility for detecting excessive AC electrical energy imposed upon the public utility in real time by the composite of the consuming customer entities, and means responsive to said sensing means for causing said special load at each consuming customer entity to be powered 1) solely by the primary source of DC power supply of the associated consuming customer entity, 2) in load-sharing fashion by the primary source of DC power supply of the associated consuming customer entity and said source of direct current power of the associated consuming customer entity, or 3) solely by said source of direct current power of the associated consuming customer entity.

4. The combination defined in claim 3 wherein said sensing means produces a variable output signal indicative of power demand made by the composite of the consuming customer entities upon the public entity, each means responsive to said sensing means comprising comparator means receiving said variable output signal from said sensing means and a reference signal.

5. The combination defined in claim 4 wherein each means responsive to said sensing means also comprises diode means connected to an associated consuming entity primary source of DC power supply means, an associated one of said consumer's special loads and the associated comparator means.

6. An electrical power management system comprising the combination of:

AC electrical connection means receiving AC electrical energy from a public utility, AC electrical load means connected to the AC electrical energy for routing AC electrical power within the power management system, and at least one DC load means within the power management system which is isolated from the AC of the public utility and may be powered solely by direct current, said power management system including two power supply means dedicated to said one DC load means, an AC-to-DC first power supply means for providing converted DC power to said DC load means, and at least one second power supply means consisting of direct current source means, sensing means tying said AC-to-DC first power supply means, said second power supply means and said DC load means together for sensing the electrical power demand placed upon the public utility by the management system and for providing variable signal outputs responsive to said power demand and to the output level state of said second power supply means relative thereto so that:

said AC-to-DC first power supply means supplies all of the power to said DC load means when the level of that variable signal output responsive to said power demand dominates;

said DC second power supply means supplies all of the power to said DC load means when the output level state of said second supply means dominates; and said AC-to-DC first power supply means and said second power supply means variably share power to said DC load means when the levels of said variable signal output due to power demand and said output level state of the second power supply means fluctuate with respect to each other.

7. An electrical power management system as defined in claim 6 wherein said DC load is a fluorescent lighting load, said sensing means including a power transducer coupled to said AC electrical power and differential amplifier means providing said variable signal outputs.

8. An electrical power management system comprising:

AC electrical connection means receiving AC electrical energy from a public utility, AC electrical load means connected to the AC electrical energy for routing AC electrical power within the power management system, and at least one DC load means within the power management system which is isolated from the AC of the public utility, said power management system including two DC power supply means dedicated to said DC load means, an AC-to-DC circuit for converting AC electrical power from the public utility to provide a dedicated first DC power supply means having positive and negative leads, and at least one DC dedicated second power supply means consisting of a direct current source having positive and negative conductors, sensing means sensing the electrical power demand placed upon the public utility by the management system for providing a variable signal output proportional to that power demand, control means tying the positive and negative leads and conductors of said dedicated first power supply means, said dedicated second power supply means and said DC load means together for responding to the relative voltage levels across said positive and negative leads and conductors and to said variable signal output so that:

said DC dedicated second power supply means supplies all of the power to said DC load means when the level of said variable signal output dominates;

said DC dedicated first power supply means supplies all of the power to said DC load means when the level of the voltage across said positive and negative conductors of said direct current source is dominated; and said first power supply means and said second power supply means variably share power to said DC load means when the levels of said variable signal output proportional to said power demand and the levels of voltage across said positive and negative leads and conductors fluctuate with respect to each other.

9. An electrical power management system as defined in claim 8 wherein said sensing means includes a differential amplifier means and a power isolation and distribution circuit.

10. An electrical power and management system as defined in claim 9 wherein said power isolation and distribution circuit comprises an array of diodes.

11. An electrical power and management system as defined in claim 8 including set point control means for altering the variable signal outputs.

12. An electrical power and management system as defined in claim 11 wherein said set point control means also controls the relative values of said variable signal outputs in accord with power demand upon the public utility.

13. The method of cooperatively operating a public AC power utility in conjunction with a plurality of electrical power consuming facilities, which comprises the steps of:

a) supplying AC power from the public utility to the various consuming facilities according to the individual power demands thereof and monitoring the individual AC power demands in real time at each facility to produce a unique AC power demand signal at each facility in which such AC power demand signals cumulatively represent the real time AC power demand on the power utility, b) converting the AC power of step a) to DC power at each of the plurality of facilities to provide a primary DC power source at each facility derived from and dependent upon said AC power, c) providing a secondary DC power source at each facility separate and distinct from said AC power and which may be in the from of a storage battery or direct current source, d) controlling the DC sources of steps b) and c) in accord with the monitoring of step a) such that the two DC power sources at each facility operate in one of three modes, a first mode in which the public utility supplies substantially all of the AC power consumed by the plurality of facilities with the real time AC power demand within peak power demand limits and the primary DC power sources of step b) in charging states, a second mode in which the public utility supplies some of the AC power consumed by the various facilities and some AC power of the public utility is converted to secondary DC power to supply some DC power of step b) to various of said facilities with the real time AC power demand still within peak power demand limits, and a third mode in which the public utility supplies AC power and each said primary DC source supplies a maximum of secondary DC power within its facility and the AC power demand is below peak power demand limits.

14. The method as defined in claim 13 wherein step d) involves establishing a plurality of set points to variably influence said modes.

15. The method as defined in claim 14 wherein said primary DC supply of step b) is dedicated to a DC load which is capable of supply by DC, such as a fluorescent lighting load, and said primary DC supply and said secondary DC supply are connected in parallel with said DC load.

16. The method as defined in claim 15 wherein said primary DC supply and said secondary DC supply are diode steered across said DC load.

17. The method of generating AC electrical power at a public utility while managing, on the consumer facility side, peak power demands made upon the public utility by a consuming facility, which comprises the steps of:

i) generating AC electrical power at a public utility and transmitting it by electrical conductors to the consuming facility, ii) providing at least one AC semi-random punctuated load means within said consuming facility, iii) connecting some of the electrical conductors of said consuming facility to said at least one AC semi-random punctuated load means of step ii) within said consuming facility, iv) converting at least some of said AC electrical power generated in step i) to direct current within said consuming facility to provide a source of converted direct current and a variable level output signal whose output level is responsive to peak power demand made upon the AC electrical power generated by the public utility in step i), v) providing an intrinsic direct current power source at said consuming facility which produces direct current separate and distinct from AC electrical power generated in step i) and/or from step iv) converted direct current, vi) providing at least one intrinsic direct current load means at said consuming facility which consumes direct current either as converted direct current of step iv), as direct current from the intrinsic direct current power source of step v), or as a combination of the two, and vii) reducing the peak power demand of the consuming facility upon the public utility by controllably directing power from step v) to step vi) in accord with said variable level signal of step iv), thereby diverting peak power demand placed upon the public utility to the intrinsic direct current source of step v).

18. The method as defined in claim 17 including the steps of a) diode-isolating said intrinsic direct current power source of step v) from said at least one intrinsic direct current load means of step vi), and b) allowing one to dominate the other in accord with the level of said variable level output signal.

19. The method as defined in claim 18 including the step of c) converting the converted direct current source of step ii) back to AC electrical power in case the whole or part of said at least one intrinsic direct current load means of step vi) cannot be served by direct current.

20. The method as defined in claim 17 wherein said AC electrical power is generated at a public utility while that power is managed, on the consumer facility side, in accord with cumulative peak power demands made upon the public utility by one or more consuming facilities, and which includes the further steps of:

A) generating AC electrical power at a public utility and transmitting it by electrical conductors to a plurality of consuming facilities, B) providing at least one AC semi-random punctuated load means within each consuming facility, C) connecting some of the electrical conductors of each consuming facility to said at least one AC semi-random punctuated load means within each consuming facility, D) converting at least some of said AC electrical power generated in step i) to direct current within each consuming facility to provide a source of converted direct current and a variable level signal indicative of cumulative peak power demand made upon the public utility by the associated consuming facilities, E) providing an intrinsic direct current source which is associated with each said consuming facility and produces direct current separate and distinct from AC electrical power generated in step A) and from step D) converted direct current, F) providing at least one intrinsic direct current load means which consumes direct current either as converted direct current of step D), as direct current from an intrinsic direct current source of step E), or as a combination of the two, and G) managing, on the consumer facility side, cumulative peak power demands made upon the public utility by one or more of the consuming facilities, by diverting direct current consumption between step D) and step E) in accord with said signal of step D).

* * * * *